(12) United States Patent
Baratta

(10) Patent No.: US 8,790,052 B2
(45) Date of Patent: Jul. 29, 2014

(54) BOLT ON DRIVE ASSEMBLY FOR A CORE DRILL WITH HIGH STRENGTH SPOKED REINFORCER

(75) Inventor: Anthony Baratta, Oak Park, CA (US)

(73) Assignee: Western Saw, Oxnard, CA (US)

( * ) Notice: Subject to any disclaimer, the term of this patent is extended or adjusted under 35 U.S.C. 154(b) by 856 days.

(21) Appl. No.: 12/799,615

(22) Filed: Apr. 27, 2010

(65) Prior Publication Data

US 2011/0262237 A1    Oct. 27, 2011

(51) Int. Cl.
*B23B 51/04*    (2006.01)
(52) U.S. Cl.
USPC ............................................ 408/204; 408/226
(58) Field of Classification Search
USPC .................. 408/204–207, 226, 703
IPC .............................................. B23B 51/04,51/05
See application file for complete search history.

(56) References Cited

U.S. PATENT DOCUMENTS

| | | | | |
|---|---|---|---|---|
| 1,426,881 | A | * | 8/1922 | Lachman ........................ 301/66 |
| 1,503,716 | A | | 8/1924 | Seyferth |
| 1,591,003 | A | * | 6/1926 | Vincent ........................... 295/27 |
| 2,750,129 | A | * | 6/1956 | Morin ............................. 40/309 |
| 2,779,361 | A | * | 1/1957 | McKiff .......................... 408/204 |
| 2,906,256 | A | | 9/1959 | Glynn |
| 2,925,739 | A | * | 2/1960 | Urquhart et al. ............... 474/174 |
| 2,950,582 | A | * | 8/1960 | Beauchaine .................. 451/342 |
| 3,220,449 | A | * | 11/1965 | Franklin ........................ 408/192 |
| 3,382,939 | A | | 5/1968 | McLendon, Sr. |
| 3,843,188 | A | * | 10/1974 | Kirschner .......................... 295/7 |
| 3,884,527 | A | | 5/1975 | Clary |
| 4,252,481 | A | | 2/1981 | Krieg |
| 5,460,432 | A | | 10/1995 | Yamazaki et al. |
| 6,494,276 | B1 | * | 12/2002 | Hamilton et al. ............. 175/403 |

(Continued)

FOREIGN PATENT DOCUMENTS

| | | | | | |
|---|---|---|---|---|---|
| CH | 602304 | A | * | 7/1978 | .............. B23B 51/04 |
| GB | 2396395 | A | * | 6/2004 | |
| RU | 2005581 | C1 | * | 1/1994 | .............. B23B 51/04 |
| WO | WO 2012148371 | A1 | * | 11/2012 | .............. B23B 51/04 |

OTHER PUBLICATIONS

Young, Lee W., International Search Report, PCT/US2011/00581, Jun. 14, 2011, 1 page ISA/US.

(Continued)

*Primary Examiner* — Eric A Gates
(74) *Attorney, Agent, or Firm* — Henricks, Slavin & Holmes, LLP

(57) ABSTRACT

A bolt on drive assembly for a core drill which utilizes an improved high strength spoked reinforcer mounted beneath a disc. The disc and high strength spoke reinforcer are removably mounted on the tube by bolt fasteners. A drive connection is removably mounted and centrally located on a outer disc of the pair of discs. The drive connection is adapted to connect with a drive shaft to cause rotation of the tube. The system can also include a split in the disc when the high strength spoked reinforcer is not welded thereto thereby providing a means of water control. The high strength spoked reinforcer can be a separate piece that is bolted to the disc or can be integrally formed as one piece therewith.

24 Claims, 6 Drawing Sheets

(56) References Cited

U.S. PATENT DOCUMENTS

| | | | |
|---|---|---|---|
| 6,514,017 B2 * | 2/2003 | DeBlasio | 408/1 R |
| 6,890,132 B1 * | 5/2005 | Baron et al. | 408/204 |
| 6,945,339 B2 | 9/2005 | Hiranuma et al. | |
| 2002/0094246 A1 | 7/2002 | Jones et al. | |
| 2003/0146024 A1 | 8/2003 | Cramer et al. | |
| 2005/0105980 A1 | 5/2005 | Davis | |
| 2009/0035082 A1 | 2/2009 | Singh | |
| 2011/0121090 A1 * | 5/2011 | Price | 239/1 |

OTHER PUBLICATIONS

Copenhaven, Blaine R., International Search Report, PCT/US2011/000748, Aug. 1, 2011, 2 pages, ISA/US.

Baratta, Diamond Tooling Journal, Ultra lightweight core bit from Western Saw (online), created Jun. 21, 2010, modified Jun. 22, 2010 [retrieved on Jul. 21, 2011], retrieved from the Internet: http://www.dij-online.com/userfiles/fileiVol70Num624_14_15 pdf, 2 pp.

\* cited by examiner

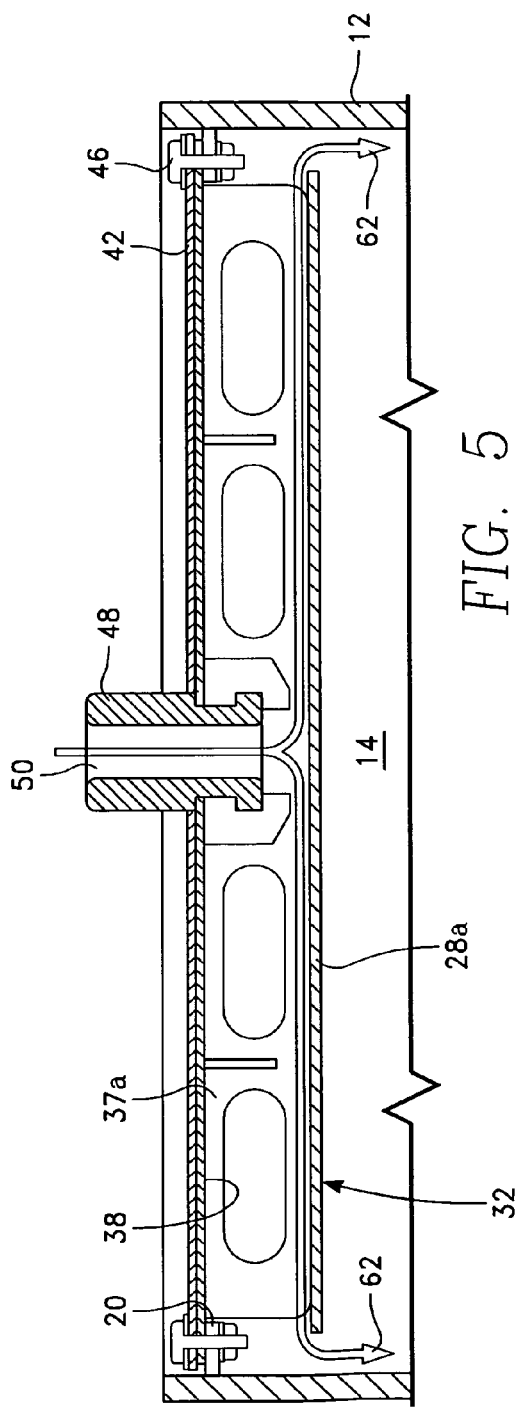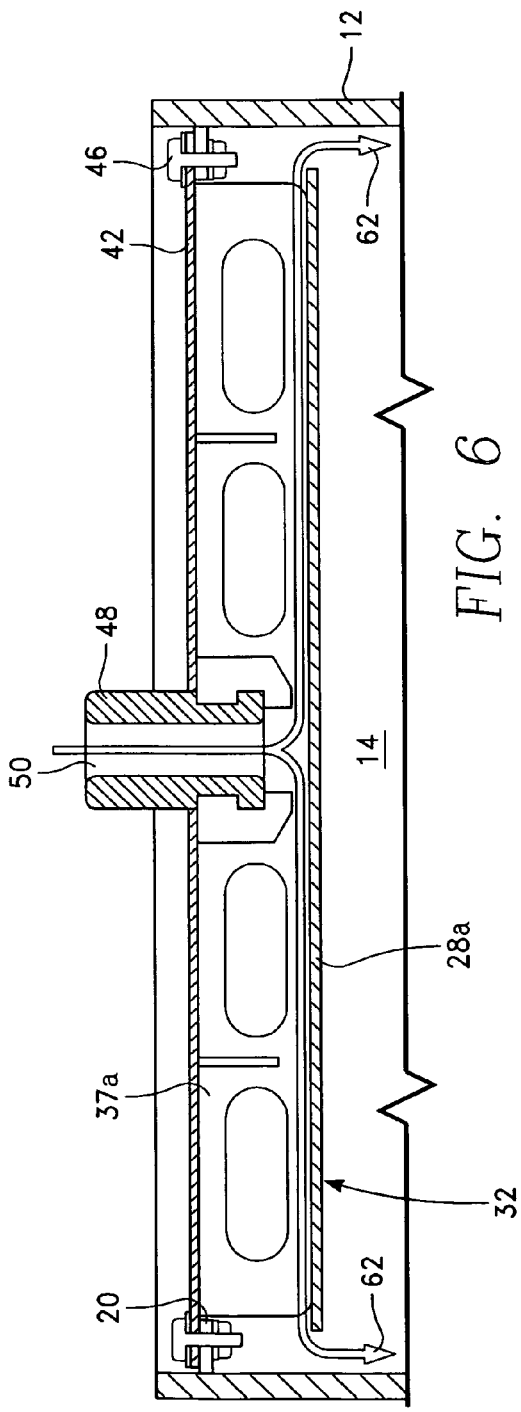

BOLT ON DRIVE ASSEMBLY FOR A CORE DRILL WITH HIGH STRENGTH SPOKED REINFORCER

BACKGROUND OF THE INVENTION

1. Field of the Invention

The field of this invention relates generally toward cutting implements and more particularly to the construction of a core drill.

2. Description of the Prior Art

Core drills are commonly used for drilling holes in hard materials, such as concrete and masonry. These holes are then used to support a structural member, such as a post, which is used on a support member for a building structure or for forming a large diameter borehole with the borehole being used for the passage of pipe lines or conduits. A typical core drill is constructed of hard metal, such as steel, and takes the shape of a tube with hardened cutting segments mounted at one end of the tube. The opposite end of the tube is closed generally by a solid steel plate with there being a drive connection mounted on this steel plate. The drive connection is to be connected to a rotating shaft of a drive machine which will cause the tube to be rotated and affect the cutting operation. The cutting segments at one end normally comprise diamonds but also it has been known to use silicon carbide. The diamonds are held together by a suitable resin adhesive.

The plate at the closed end of the tube is of substantial thickness, generally one half to one and a half inch thick. These core drills are frequently designed to be from six inches to thirty-six inches and more in diameter. The steel plate at the closed end is of substantial weight. It is important to have an extremely strong member at this closed end because all the force from the driving machine is being transferred to this member to the tube. The force encountered by the tube in cutting the hole in masonry and concrete is substantial so it is important that the plate at the closed end of the tube establish an extremely strong connection. However, most often these core drills are carried by a human from one location to another. The plate member at the closed end of a sixteen inch core drill is substantially heavier than the core drill constructed in accordance with this invention. That extra weight can make the difference as to whether a core drill can be carried by a single human from one location to another. It is readily apparent that the greater the diameter of the core drill the greater of the additional amount of weight. It would be desirable to design some type of closed end structure for a core drill which would be substantially lighter in weight than if a solid plate is used. Furthermore, there is a certain amount of deflection associated with the use of the core drill.

At times, when operating of a core drill, a plug of material, which would be normally masonry or cement, gets caught within the hollow chamber of the core drill adjacent the closed end plate. At the present time, access into this area is only provided through the open end of a core drill which means some kind of an elongated member has to be extended up through the hollow chamber of the core drill and this member wedged against the caught material and somehow loosen it to dislodge it. It would be desirable to construct a core drill so that the closed end portion of the core drill could be removed from the tube which would provide immediate local access to any wedged material that is caught within the hollow chamber and located directly adjacent the closed end.

The instant invention is an improvement over U.S. Pat. No. 6,890,132 wherein large improvements in applied load vs. deflection and weight vs. tube diameter have been found.

SUMMARY OF THE INVENTION

The instant invention teaches a bolt on drive assembly for a core drill comprising: a cylindrical tube having a cutting edge at one longitudinal end and an open end at an opposite longitudinal end; a mounting means mounted at said open end; a high strength spoked reinforcer, said spoked reinforcer having a center hub from which extends radially a plurality of spoked members, said spoked members has a strengthening member extending perpendicularly therefrom in the direction of the Z-axis and wherein said spoked members being attached to said mounting means; a disc mounted onto said high strength spoked reinforcer and also onto said mounting means; a drive connection centrally mounted on said disc, said drive connection adapted to connect to a drive shaft to cause rotation of said tube; and a series of removable fasteners to secure said disc and said high strength spoked reinforcer to said mounting means.

The above embodiment can be further modified by defining that the tube has a hollow chamber, said mounting means comprising a mounting ring, said mounting ring being located within said hollow chamber.

The above embodiment can be further modified by defining that a water stop disc is mounted to said high strength spoked reinforcer, said water stop disc to function to prevent the passage of water from within said hollow chamber through said open end.

The above embodiment can be further modified by defining that the drive connection comprises a coupler adapted to be threadably secured to a drive shaft.

The above embodiment can be further modified by defining that the coupler is removably mounted with bolt fasteners to said high strength spoked reinforcer.

The above embodiment can be further modified by defining that the high strength spoked reinforcer is integrally formed as one piece with said disc.

The above embodiment can be further modified by defining that each of said plurality of spoke members is offset from said center hub.

The above embodiment can be further modified by defining that each of said plurality of spoke members includes one or more supports along the length of each of said plurality of spoke members.

BRIEF DESCRIPTION OF THE DRAWINGS

FIG. 5 is a transverse cross-sectional view through the assembled drive assembly of the core drill of an alternate embodiment of the invention wherein the vertical portion of each of the arms of the high strength spoked reinforcer is rectangular rather than triangulated and is a stand alone piece;

FIG. 6 is a transverse cross-sectional view through the assembled drive assembly of the core drill of a second alternate embodiment of the invention where in the spoked reinforcer is welded directly the top plate and the vertical portion of each of the arms of the high strength spoked reinforcer is rectangular rather than triangular.

DETAILED DESCRIPTION OF A PREFERRED EMBODIMENT

Figure 1:
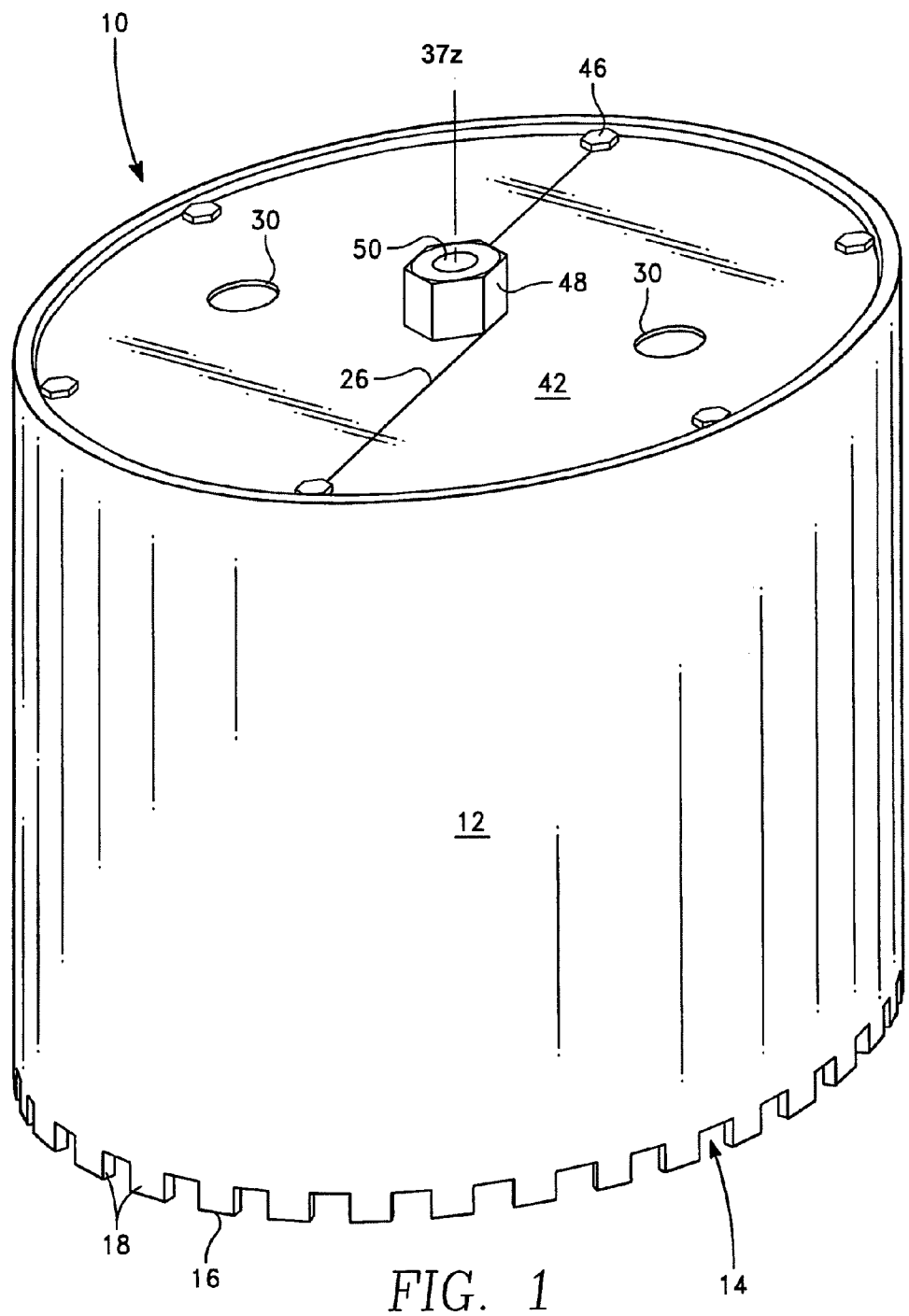
FIG. 1 is an external isometric view of the preferred embodiment of core drill constructed in accordance with this invention.

Turning to the drawings, the preferred embodiment is illustrated and described by reference characters that denote similar elements throughout the several views of the instant invention.

Referring particular to FIG. 1, there is shown the preferred embodiment 10 of the core drill constructed in accordance with this invention. The core drill 10 has a body that is in the shape of a tube 12. This tube 12 will have variable diameter. The tube 12 has a through hollow chamber 14. At one longitudinal end 16 of the core drill 10, there is adhesively or otherwise permanently affixed a series of cutting segments 18. Generally, the cutting segments 18 will comprise diamonds. The cutting segments 18 are what produce the cut within the material, which is generally cement or masonry. This cut is produced by rotation of the tube 12.

Figure 2:
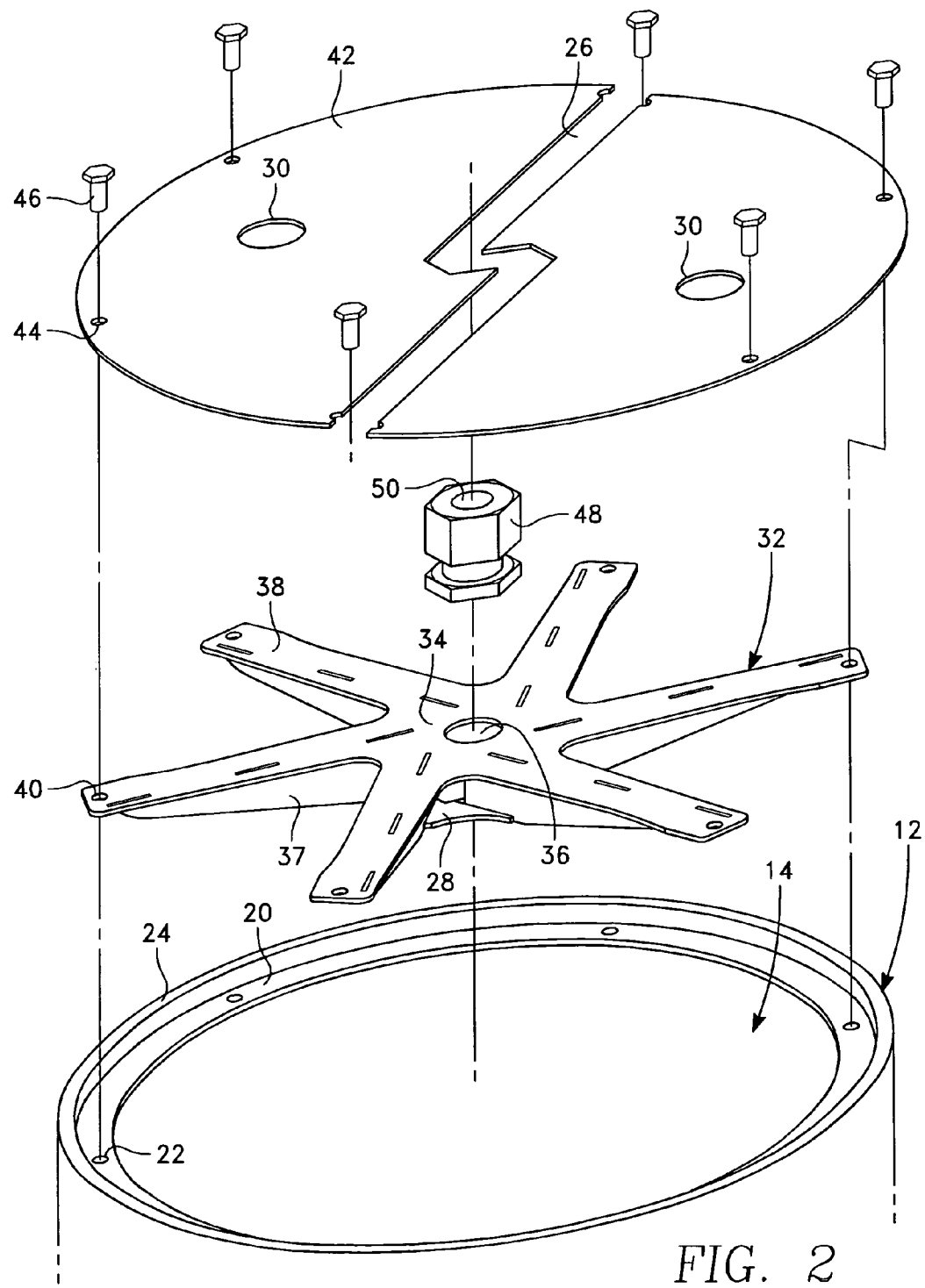
FIG. 2 is an exploded isometric view of the bolt on drive assembly of the preferred embodiment that is constructed in accordance with this invention where the connector of the drive assembly is welded onto a outer disc.

FIG. 2 shows an exploded view of FIG. 1. At the opposite longitudinal end of the tube 12 from one longitudinal end 16 there is located a mounting ring 20. The mounting ring 20 has a series of spaced apart threaded holes 22. The mounting ring 20 is generally no more than one-half to three-quarters of an inch wide and is to be fixedly mounted to the wall of the hollow chamber 14 a slight distance spaced from the outer edge 24 of the tube 12. Normally, this spacing of the mounting ring 20 will be no more than one-half inch. The mounting ring 20 is generally fixedly secured to the tube 12 by welding.

Mounted within the hollow chamber 14 is a disc 42. The disc 42 functions as a cover. The disc 42 has a series of through holes 44 located directly adjacent the peripheral edge of the disc 42. In the preferred embodiment, there are through holes 44 to align with through holes 40 for each of the radial arms 38 of a high strength spoked reinforcer 32. A bolt fastener 46 is to be placed through each of the aligned holes 44, 40 and then be threadably tightened within the threaded hole 22. This will secure in place the drive assembly which is composed minimally of the high strength spoked reinforcer 32 and the disc 42. The disc 42 provides for the prevention of the passage of water through the hollow chamber 14 and prevent such from being discharged from the tube 12 past the mounting ring 20. Water is frequently used when drilling of cement and masonry in order to minimize the creation of heat. Water control can also be achieved by an optional split 26 in the disc 42 as well as one or more apertures 30 found thereon. The drive assembly, which is composed of the high strength spoked reinforcer 32 and the disc 42 is exceedingly strong but is much lighter in weight than if it were a completely solid steel plate. This has an advantage in that the overall core drill is lessened in weight therefore facilitating its carryablity by a human.

Centrally mounted on the disc 42 is a drive connection 48. Drive connection 48 is shown to be in the shape of a hexagonal nut and has an internal threaded opening 50. This internal threaded opening 50 is to connect to a drive shaft of a driving machinery, which is not shown. The driving machinery is to affect rotation of the drive connection 48 and the entire core drill 10. The drive connection is to be welded about center hole 52 formed within the outer disc 42.

Figure 7:
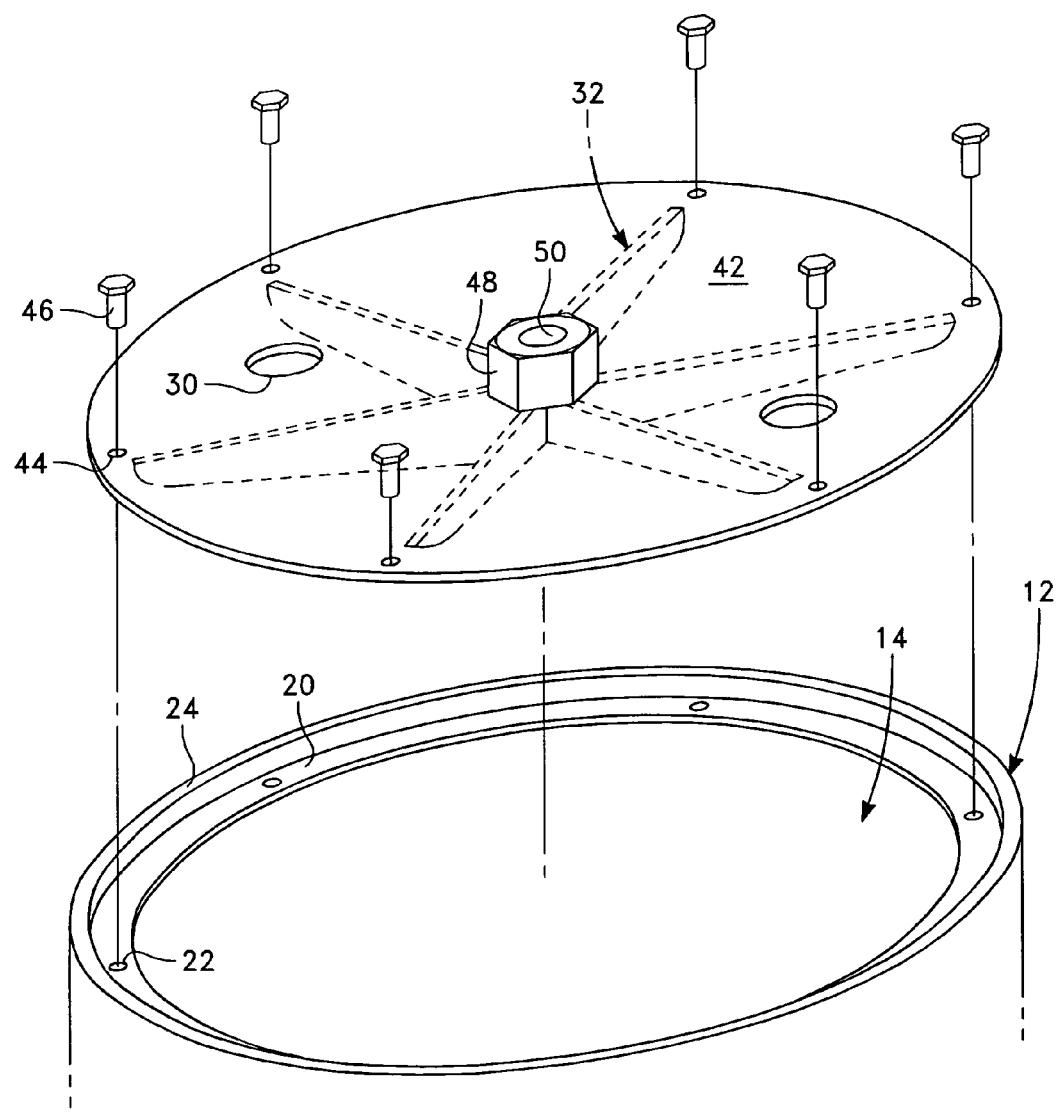
FIG. 7 is similar to FIG. 2, but wherein the high strength spoked reinforcer is welded directly to the top plate.

The high strength spoked reinforcer 32 is situated either as a separate part (See FIG. 1) or as an integral welded piece to the disc 42 (See FIG. 7). The high strength spoked reinforcer 32 has a centrally located hub 34 which also has a center hole 36 to facilitate handling. Extending radially outward from the hub 34 are a plurality of spaced apart radial arms 38. There are shown six in numbers of the arms 38. Typically, there will only be used six in number of the arms 38 when the diameter of the tube 12 is thirty inches and less. As the diameter increases, the number of arms 38 may be increased. Directly adjacent the outer end of each of the arms 38 is a through hole 40. A through hole 40 is to be in alignment with a through hole 44. A water stop base 28 sandwiches the high strength spoked reinforcer 32 and the disc 42.

As can be seen in FIG. 2, the high strength spoked reinforcer 32 includes strengthening members 37 on respective arms and that extend along the Z-axis 37z and is 3-dimensional. It is this 3-dimensional structure that provides for the increased performance at high weights with reduced deflection vs. weight ratios. The deflection vs. weight ratio mimics a solid plate's performance whereas a 2-dimensional spoked reinforcer sees significant deflection at higher weights. The high strength spoked reinforcer 32 serves the two fold purpose of reduced weight for larger diameter cores and reduced deflection at said large diameters.

Figure 3:
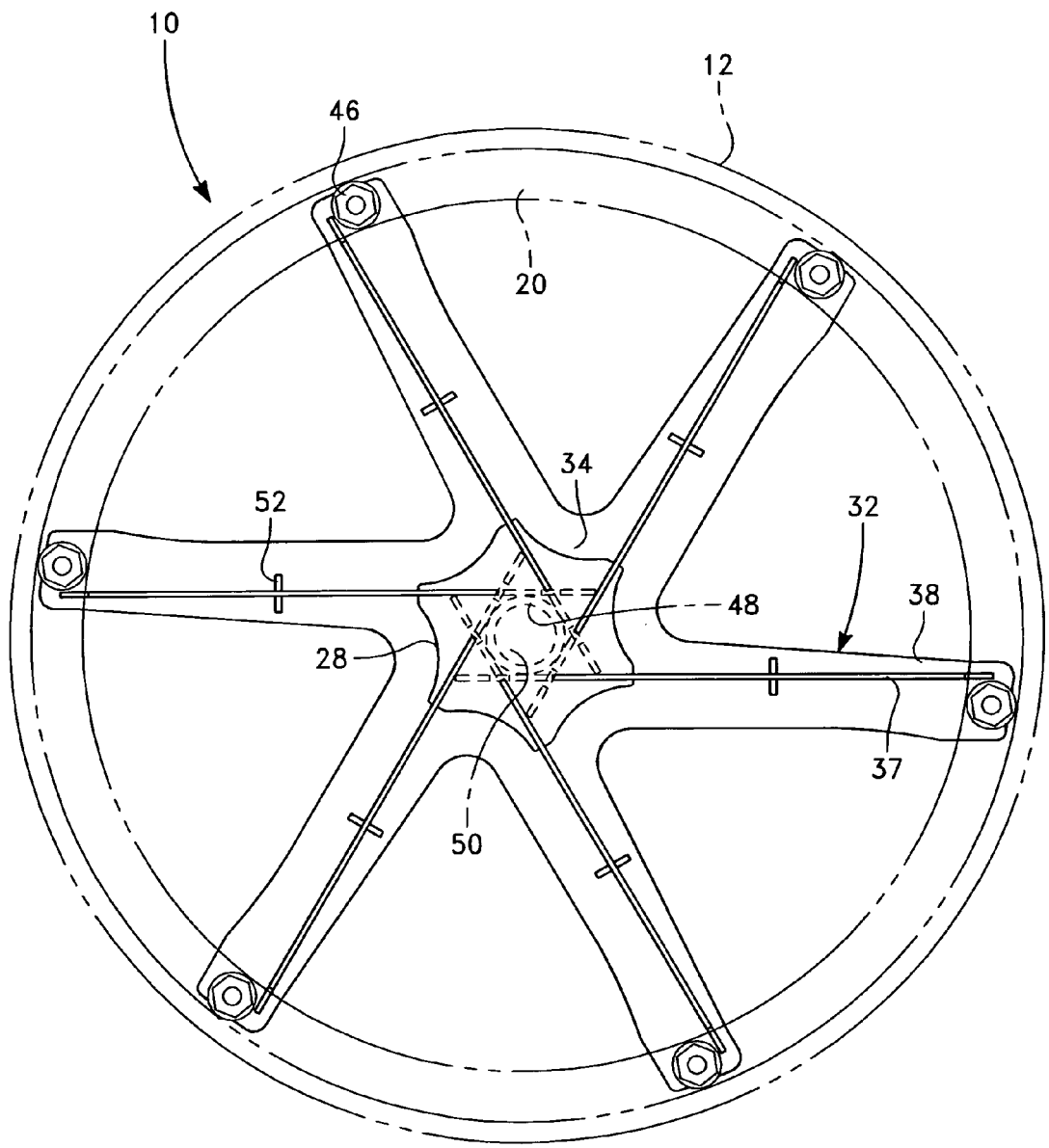
FIG. 3 is an inside bottom view of the high strength reinforcer looking up from the cutting edge of the drill.
Figure 4:
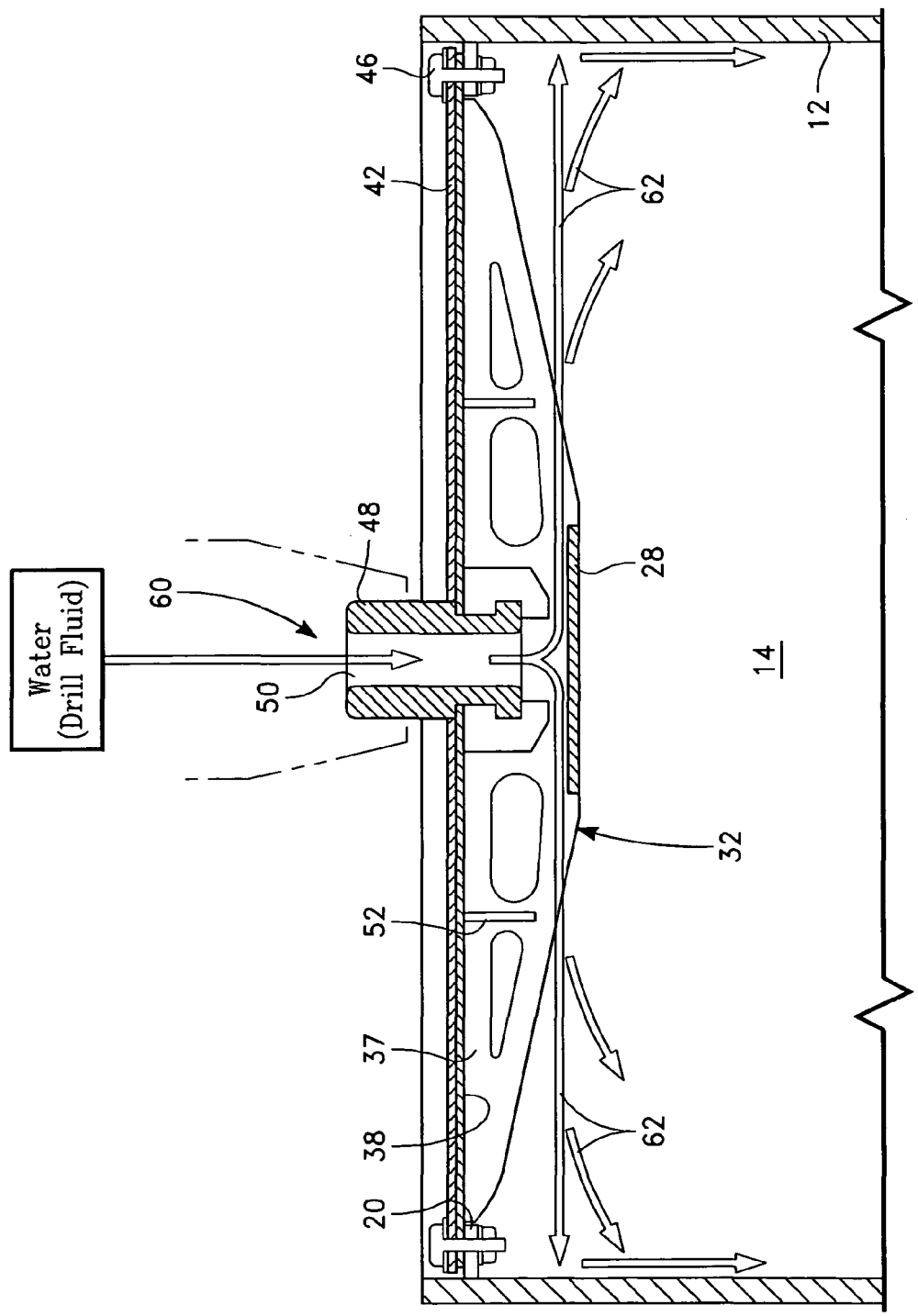
FIG. 4 is a transverse cross-sectional view through the assembled drive assembly of the core drill of the preferred embodiment of this invention.

As shown when considering FIGS. 2-4, the base 28 includes slots extending from a perimeter portion of the base internally to the base a discreet distance. Each slot receives a portion of a respective strengthening member 37 extending in the present example through the base 28 to be visible from the bottom view as shown in FIG. 3. In the present example, six slots receive respective portions of strengthening members 37. As shown in FIG. 4, a surface on the lower most portion of a strengthening member 37 is flush with a lower surface of the base 28.

FIG. 3 is an inside bottom view of the high strength spoked reinforcer 32 when looking up from the water stop base 28. Above the water stop base 28 is the hub 34 of the high strength spoked reinforcer 32. This hub 34 includes the hole 36 that receives the drive connection 48. It is important to note that each of the radial arms 38 are off-set from the center 34. This offset distributes the load in an advantageous manner, reducing deflection during use. Also included on the arms 38 are supports 52. When the diameter of the drilling exceeds 32 inches, a support is added for approximately every 9 inches distance from the hub 34.

Note that in the view shown in FIG. 3, the high strength spoked reinforcer 32 can either be bolted to the disc 42 or be formed as an integral piece with the disc 42 and bolted only to the mounting ring 20. FIG. 7 shows the alternate embodiment of the invention wherein the plate 42 is welded to the high strength spoked reinforcer 32. Note that there is no optional split 26 in this embodiment.

FIGS. 4-6 show a cross-sectional side view of three different embodiments. In FIG. 4 the preferred embodiment is shown. Drill fluid 60, usually water, enters through the cavity 50 in the drive 48. The direction of the arrows 62 demonstrates how the water enters the system and is flung to the outer edges as the drill is spinning. In this embodiment, the high strength spoked reinforcer 32 is welded to the disc 42 and bolted down through bolts 46 to the mounting ring 20. In this embodiment, the strengthening members 37 have a triangular profile in the direction of the Z-axis 37z relative to the water stop base 28.

FIG. 5 shows an alternate embodiment wherein the high strength spoked reinforcer 32 is bolted to a top disc 42. Also in this embodiment it is shown that the water base plate 28a extends to the outer perimeter of the drill. When the water base plate 28a extends all the way to the outer perimeter, the strengthening members 37a of the high strength spoked reinforcer 32 in the Z-axis 37z are rectangular in profile rather than triangular as seen in FIG. 4. FIG. 6 is the same embodiment as shown in FIG. 5, except that the high strength spoked reinforcer 32 is welded directly to the disc 42 and not bolted on as seen in FIG. 6.

When the instant invention is compared to the system described in U.S. Pat. No. 6,890,132, the improvements in applied load vs. deflection and weight vs. tube diameter are substantial, with the greater benefit being found with increases in the diameter of the core drill 10.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A bolt on drive assembly for a core drill comprising:
a cylindrical tube having a cutting edge at one longitudinal end and an open end at an opposite longitudinal end;
a mounting means mounted at said open end; a high strength spoked reinforcer, said spoked reinforcer having a center hub from which extends a plurality of spoked members, wherein the center hub has a hub central axis extending in a direction of a Z-axis and wherein the spoked members have respective central axes wherein a spoked member central axis does not intersect the hub central axis, said spoked members having respective strengthening members extending perpendicularly therefrom in the direction of the Z-axis and wherein said spoked members being attached to said mounting means;
a disc mounted onto said high strength spoked reinforcer and also onto said mounting means;
a drive connection centrally mounted on said disc, said drive connection adapted to connect to a drive shaft to cause rotation of said tube; and
a series of removable fasteners to secure said disc and said high strength spoked reinforcer to said mounting means.

2. The bolt on drive assembly as defined in claim 1 wherein said tube having a hollow chamber, said mounting means comprising a mounting ring, said mounting ring being located within said hollow chamber.

3. The bolt on drive assembly as defined in claim 1 wherein a water stop disc is mounted to said high strength spoked reinforcer, said water stop disc to function to prevent the passage of water from within said hollow chamber through said open end.

4. The bolt on drive assembly as defined in claim 1 wherein said drive connection comprising a coupler adapted to be threadably secured to a drive shaft.

5. The bolt on drive assembly as defined in claim 4 wherein said coupler being removably mounted with bolt fasteners to said high strength spoked reinforcer.

6. The bolt on drive assembly as defined in claim 1 wherein said high strength spoked reinforcer is integrally formed as one piece with said disc.

7. The bolt on drive assembly as defined in claim 1 wherein each of said plurality of spoke members includes one or more supports along the length of each of said plurality of spoke members.

8. A cutting tool for a core drill comprising
a cylindrical tube having a cutting edge at a first end surface and having a second end surface opposite the first end surface;
a mounting element adjacent the second end surface;
a disc mounted to the mounting element; and
a support structure supporting the mounting element and having a plurality of arms wherein each arm extends substantially in a plane with the other arms of the plurality of arms, and wherein each arm includes a second structure on the support structure mounted to a single arm and extending in a direction toward the first end surface and wherein each second structure intersects a plurality of other second structures.

9. The cutting tool of claim 8 wherein each second structure is perpendicular to the respective arm.

10. The cutting tool of claim 8 wherein the plurality of arms contact the mounting element.

11. The cutting tool of claim 8 wherein the second structures extend to respective positions adjacent the mounting element.

12. The cutting tool of claim 8 wherein respective arms are supported by the mounting element by respective fasteners extending through the respective arms and the mounting element through corresponding openings, and the respective second structure is spaced from the corresponding opening.

13. A cutting tool for a core drill comprising
a cylindrical tube having a cutting edge at a first end surface and having a second end surface opposite the first end surface;
a mounting element adjacent the second end surface;
a disc mounted to the mounting element; and
a support structure supporting the mounting element and having a plurality of arms wherein each arm extends substantially in a plane with the other arms of the plurality of arms, and wherein each arm includes a second structure on the support structure mounted to a single arm and extending in a direction toward the first end surface and wherein each second structure does not intersect a central axis of the cylindrical tube.

14. A cutting tool for a core drill comprising
a cylindrical tube having a cutting edge at a first end surface and having a second end surface opposite the first end surface;
a mounting element adjacent the second end surface;
a disc mounted to the mounting element; and
a support structure supporting the mounting element and having a plurality of arms wherein each arm extends substantially in a plane with the other arms of the plurality of arms, and wherein each arm includes a second structure on the support structure mounted to a single arm and extending in a direction toward the first end surface and wherein a second structure is perforated.

15. A cutting tool for a core drill comprising:
a cylindrical tube having a cutting edge at a first end surface and having a second end surface opposite the first end surface;
a mounting element adjacent the second end surface;
a disc mounted to the mounting element;
a drive element extending through an opening in the disc and having a plurality of lateral surfaces extending on each side of the disc; and
a support structure mounted to and extending away from a surface of the disc, and including a plurality of longitudinally-extending surfaces wherein there is a longitudinally extending surface for each lateral surface on the drive element.

16. The cutting tool of claim 15 wherein the drive element is hexagonal and the longitudinally extending surfaces form a hexagonal opening.

17. The cutting tool of claim 15 wherein the plurality of lateral surfaces extend parallel to the longitudinally extending surfaces.

18. A cutting tool for a core drill comprising
a cylindrical tube having a cutting edge at a first end surface and having a second end surface opposite the first end surface;
a mounting element adjacent the second end surface;
a support supporting the mounting element and having a plurality of arms, each of the plurality of arms of the support extending from respective positions interior to the second end surface to a respective position adjacent the mounting element, wherein a plurality of the arms include reinforcing portions extending from a respective arm in a direction toward the first end surface a maximum amount constituting a first distance, and wherein at least one reinforcing portion has a wall thickness and wherein the wall thickness is less than the first distance and wherein each of the plurality of reinforcing portions intersects at least two others of the plurality of reinforcing portions.

19. The tool of claim 18 further including a support structure mounted to the reinforcing portions on sides of the reinforcing portions opposite the arms.

20. The tool of claim 18 wherein ends of the plurality of arms are mounted to the mounting element.

21. The tool of claim 18 further including a disc, wherein the disc includes a plurality of pieces formed into a disc configuration at the second end surface.

22. The tool of claim 18 wherein an intersection of the plurality of reinforcing portions forms a polygon around a driver mounting element.

23. The tool of claim 18 wherein the plurality of arms are mounted to the disc and the disc is mounted to the mounting element.

24. A cutting tool for a core drill comprising
a cylindrical tube having a cutting edge at a first end surface and having a second end surface opposite the first end surface;
a mounting element adjacent the second end surface;
a support supporting the mounting element and having a plurality of arms, each of the plurality of arms of the support extending from respective positions interior to the second end surface to a respective position adjacent the mounting element, wherein a plurality of the arms include reinforcing portions extending from a respective arm in a direction toward the first end surface a maximum amount constituting a first distance, and wherein at least one reinforcement portion has a wall thickness and wherein the wall thickness is less than the first distance and wherein each of the plurality of arms includes a respective central axis not intersecting a central axis of the cylindrical tube.

* * * * *